United States Patent [19]

Bosma

[11] Patent Number: 5,477,602
[45] Date of Patent: Dec. 26, 1995

[54] METHOD AND APPARATUS FOR PRODUCING A RADIALLY AND CIRCULARLY CONTOURED SURFACE

[75] Inventor: Marinus B. Bosma, Tipp City, Ohio

[73] Assignee: Bosma Machine & Tool Corporation, Tipp City, Ohio

[21] Appl. No.: 296,903

[22] Filed: Aug. 29, 1994

[51] Int. Cl.⁶ ............................. B23P 13/02; B23C 3/16
[52] U.S. Cl. .......................... 29/428; 359/851; 409/132; 409/162; 451/41
[58] Field of Search .................... 29/56.5, 27 C, 29/27 R, 561, 428; 409/131, 132, 202, 212, 145, 149, 162, 163; 451/41; 359/883, 851

[56] References Cited

U.S. PATENT DOCUMENTS

| | | | |
|---|---|---|---|
| 1,362,816 | 12/1920 | Olson | 409/162 |
| 1,624,085 | 4/1927 | Wegner | 409/162 |
| 3,464,314 | 9/1969 | Gladwin | 409/162 X |
| 4,118,844 | 10/1978 | Matsuaki et al. | 29/27 C |
| 4,198,183 | 4/1980 | Kummer et al. | 409/132 |
| 4,629,378 | 12/1986 | Parsons | 409/131 |
| 4,802,309 | 2/1989 | Heynacher | 51/62 |
| 4,840,095 | 6/1989 | Nussbaumer et al. | 29/27 C |
| 5,351,376 | 10/1994 | Kitamura | 29/27 C |

FOREIGN PATENT DOCUMENTS

| | | | |
|---|---|---|---|
| 3624284 | 2/1987 | Germany | 29/27 C |

*Primary Examiner*—William Briggs
*Attorney, Agent, or Firm*—William Weigl

[57] ABSTRACT

A method and apparatus are provided for the production of panels for a large segmented parabolic telescope reflector, using a simple adaptation of a technique common to a lathe. The reflective surface of each panel is contoured both radially and circularly by oscillating a platen supporting the panel about a fixed axis relative to a tool which is fixed during platen oscillation. The tool is repositionable between oscillations along an x axis to achieve the radial contour and along a z axis to achieve the desired parabolic or spherical contour. Contrary to the normal contouring of such a surface with a 5-axis CNC machine, tool positioning along either axis is independent of tool location along the other axis, simplifying the machine structure as well as its computerized operation. A unique hinge is provided to restrain the platen in a radial direction while allowing floating action of the platen on an air cushion during its oscillation.

26 Claims, 6 Drawing Sheets

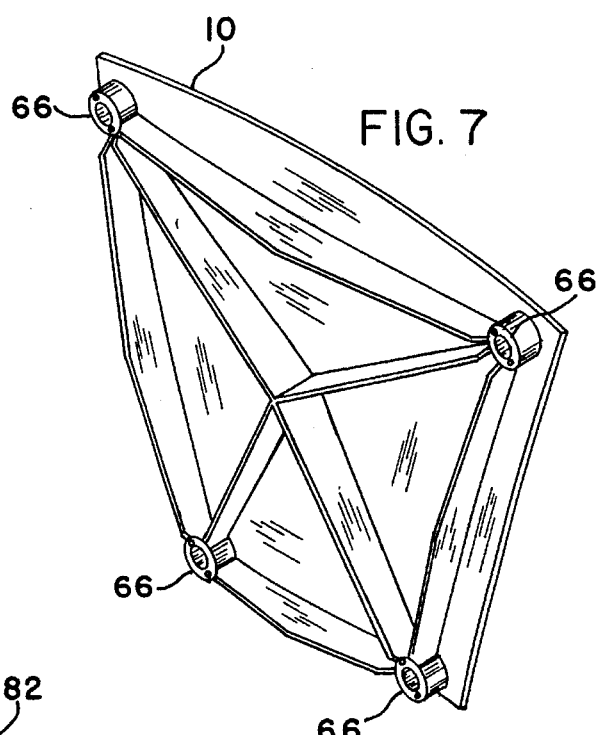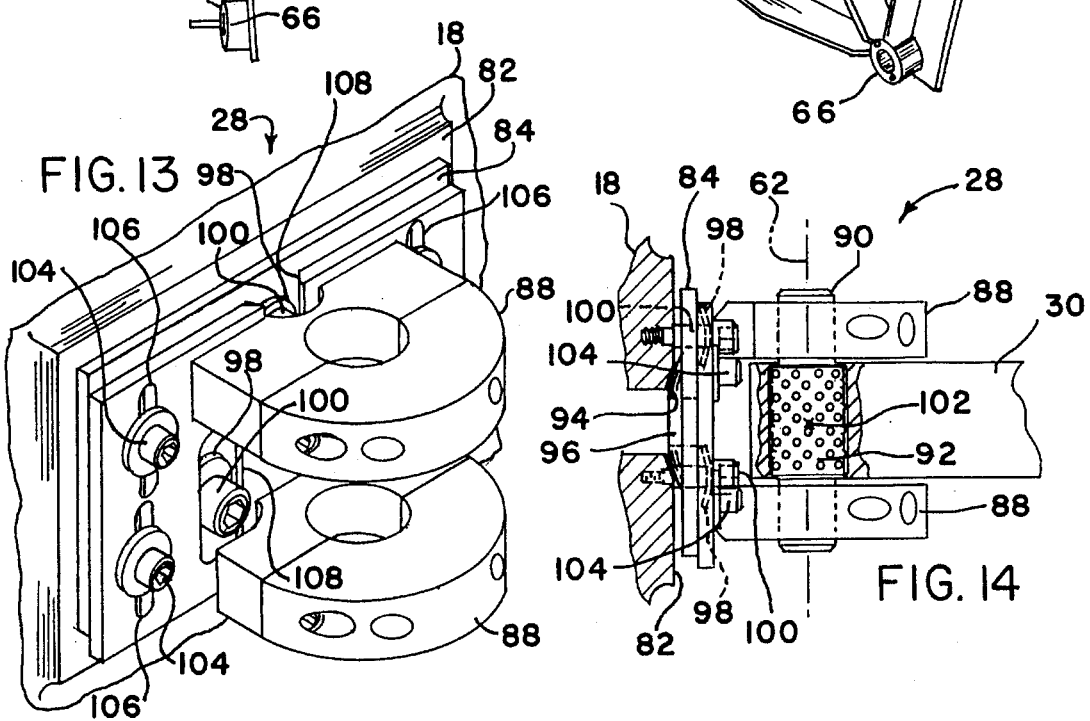

METHOD AND APPARATUS FOR PRODUCING A RADIALLY AND CIRCULARLY CONTOURED SURFACE

This invention relates generally to a machine for producing a parabolic, hyperbolic or spherical surface on a relatively large workpiece, and in particular to a machine which simulates lathe-type techniques in the manufacture of independent panels which are to be assembled into a segmented parabolic reflector for an astronomical telescope.

BACKGROUND OF THE INVENTION one of the few technological fields where "bigger is better" is that of telescopic instruments used in the exploration of outer space. The resolution of a telescope for light capturing increases in direct proportion to the diameter of its primary mirror or lens. Prior to dedication of the first reflector-type telescope in 1917, astronomers had been limited to using refractive lens-based instruments. After the conversion to reflection, and even until only recently, the reflective mirrors were also produced from glass. The low thermal inertia of the larger glass lenses had a tendency to distort the incoming light because the air immediately adjacent the lens was almost always either hotter or cooler than the lens itself. In subsequent developments, the lens mass was reduced by sandwiching a glass core between thin outer glass plates, but this too had size as well as production limitations.

In the late 1970's, building of larger parabolic reflectors became more practical due to the advent of the computer. The mirror was made of segments like a jigsaw puzzle, which enabled the individual pieces to be made in the form of panels which are thin and light in weight. When assembled, the panels were individually tipped, tilted and pistoned up and down at balljoint-supported corners or sides under very accurate computer control. Under this technique, known as adaptive optics, each panel was kept within a 0.001 micron optical tolerance to the next adjacent panel. This was made possible by development of sensors which were able to detect even the minutest displacements. Constant adjustment, up to a thousand times per second, is made to compensate for the up and down tilt and rotation of the reflector and the attendant effect of gravity resulting from those movements. Wind, is yet another factor requiring frequent segment adjustment. One scientific article has described a computerized model of the effects of wind on such a segmented mirror as resembling "nothing so much as a manta ray thrashing in a turbulent sea".

Computerization has also led to effectively combining the readings from multiple smaller mirrors to achieve the resolution of a much large mirror. One proposed design is said to be able to combine six 3-foot mirrors with one 6-foot mirror to simulate the resolution of a single large 20-foot diameter mirror. While this technique has been known since the 1930's, it has become feasible only recently because of the capabilities of high speed computers.

A relatively recent and innovative panel design employs the use of pure aluminum, machined with a burnishing effect to provide the necessary highly-polished mirror surface. Pure aluminum does not oxidize, nor does it require repolishing (which would in itself destroy the accuracy of the surface). It must, however, be kept clean. The typical environment for such a mirror is in a mountain-top observatory, away from most elements capable of causing contamination of the reflective surface. Producing a concave, parabolic surface by machining may be possible with some difficulty and much expense on a 5-axis CNC (computerized, numerically controlled) milling machine. The tool for CNC machining, would necessarily be one with only minimum point contact because of the compound motions necessary to achieve the accuracy of finish required. Such a point would likely cause only burnishing of a concave aluminum surface without actual metal removal. Obviously, the complexity of the 5-axis machine, its programming and its operation would make a simpler and more easily operated machine desirable.

SUMMARY OF THE INVENTION

A relatively simple 2-axis machine simulating some of the machining techniques of a conventional lathe is employed to create a radially and circularly contoured surface on a workpiece such as a panel designed for use in a segmented, telescope mirror. Each axis is independently controlled, enabling the use of extremely simple computer programming. Contrary to normal lathe practice, however, in order to achieve a perfect optical axis, the large workpiece is rotated or oscillated past a fixed position tool in an arcuate path. Conventional lathe practice on much smaller workpieces results in a compound movement of the tool, resulting in a spiral or helical (rather than arcuate) swath being cut. A helical cut is incapable of providing the essential contour for a telescope reflector.

A principal object of the invention is to provide a relatively simple machine and method for producing a highly-polished, very accurate parabolic surface on a panel of a segmented mirror of a telescope.

A further object is to accomplish the foregoing by means of a 2-axis machine which is relatively inexpensive to program and easy to operate.

Another object is to machine either a concave or convex surface on any large workpiece where an accurate surface finish is required, and to do so at minimal cost and with a relatively high rate of productivity.

Still another object is to provide a unique hinge for maintaining a high degree of accuracy laterally of the hinge while enabling limited axial and rolling motion of the hinge member.

Further objects and advantages will become apparent from the following description, in which reference is made to the accompanying drawings.

BRIEF DESCRIPTION OF THE DRAWINGS

FIGS. 7, 8 and 9 are isometric, side and top views respectively of a panel produced by the method and machine of this invention.

FIG. 13 is an isometric view of a unique hinge for the platen.

FIG. 14 is a side elevational view of the hinge of FIG. 13, pivotally supporting one end of the platen of FIG. 10.

DESCRIPTION OF THE PREFERRED EMBODIMENT

Figure 2:
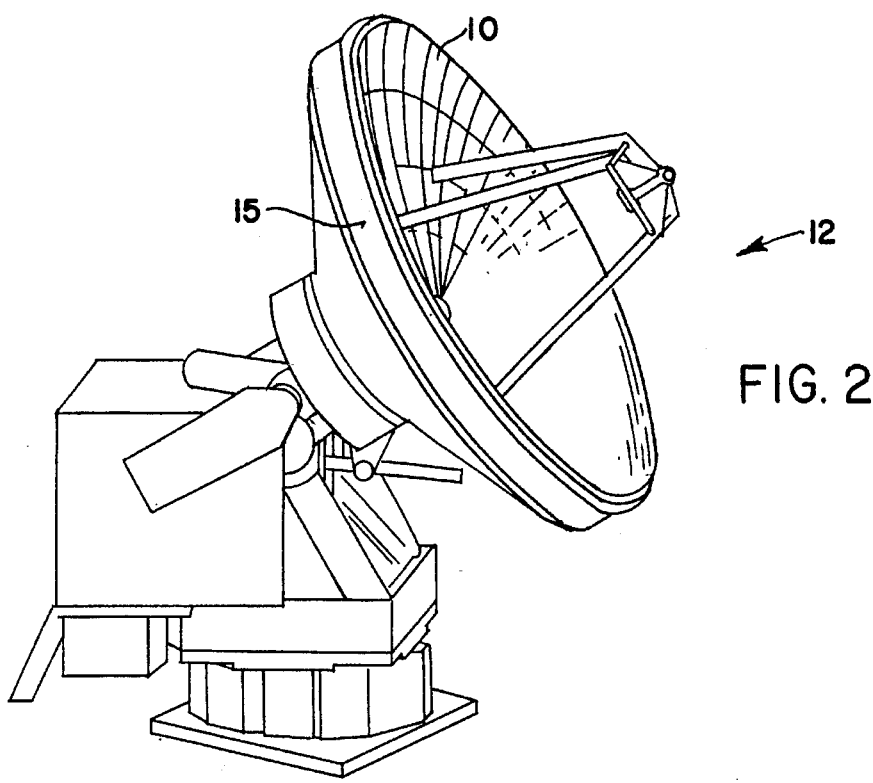
FIG. 2 shows a large diameter single parabolic reflector the segments of which can be produced on the disclosed machine.
Figure 1:
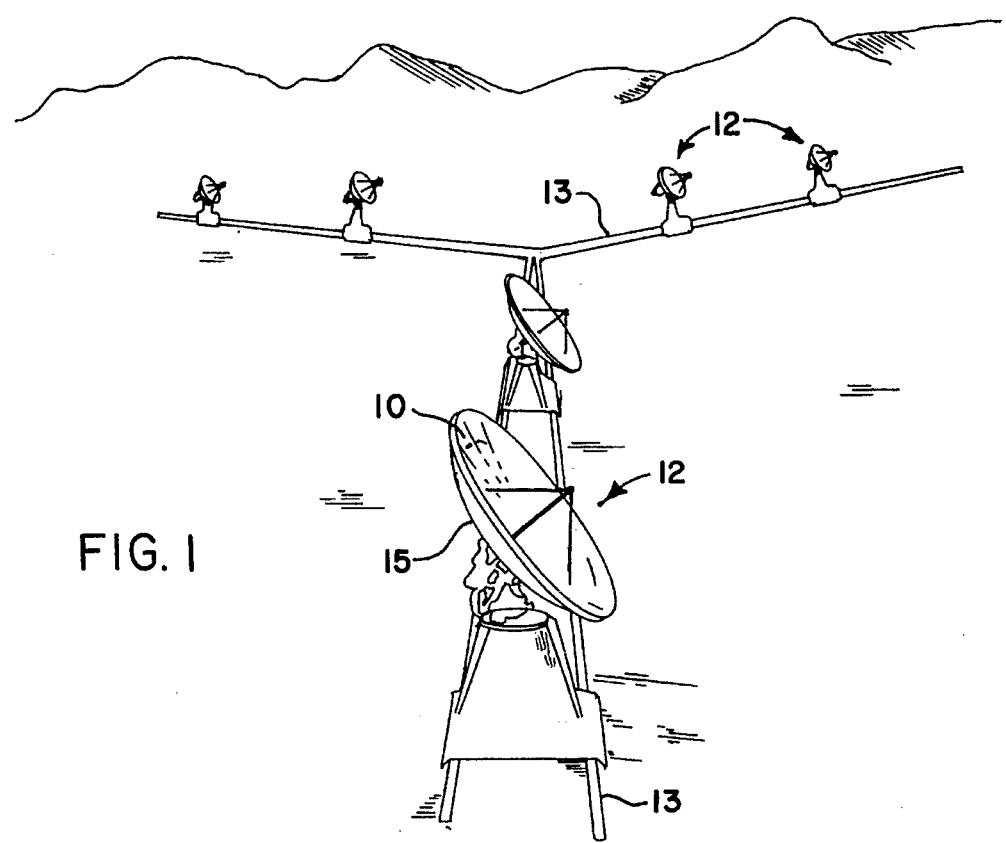
FIG. 1 is an isometric depiction of an array of segmented parabolic reflectors which are computerized to coact and simulate tie resolution of a single image of the subject under observation.
Figure 3:
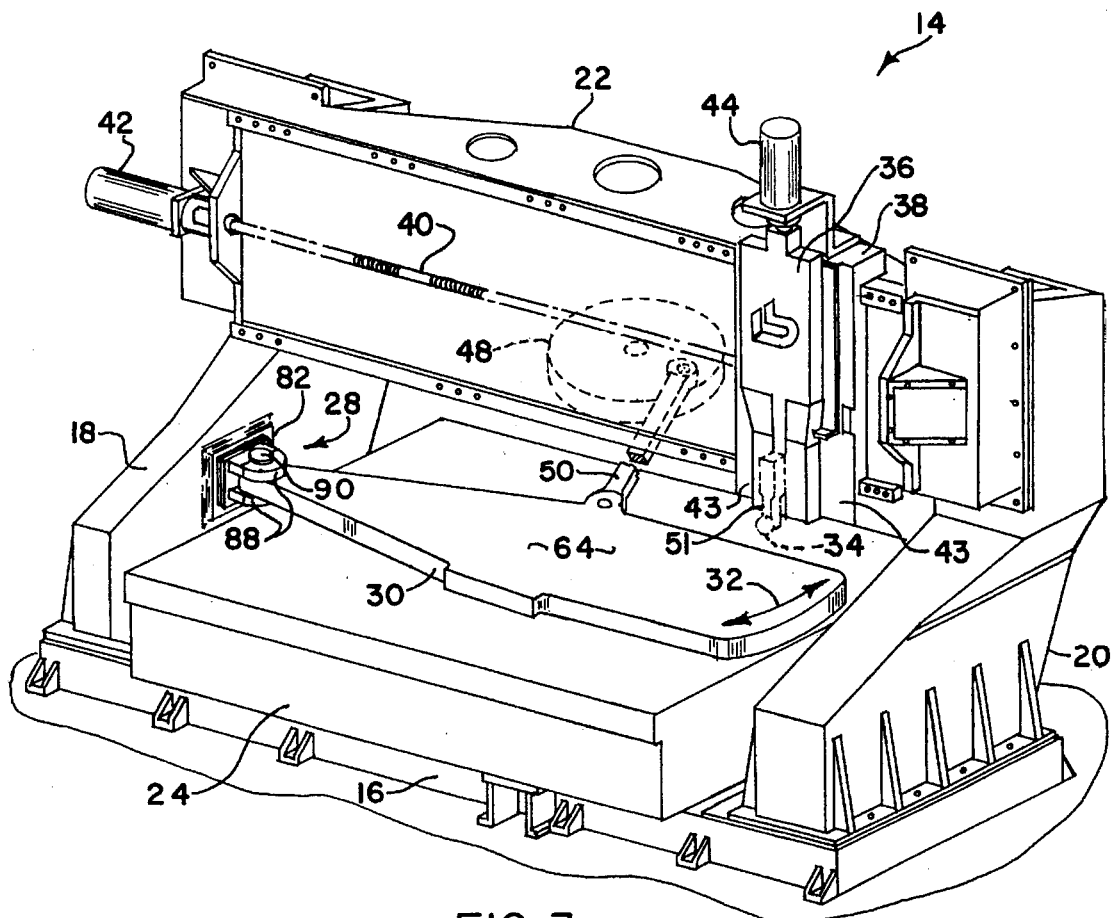
FIG. 3 is an isometric elevational view of the improved machine taken from an operator's side.

To illustrate a primary end product use resulting from the machine of the invention, two different types of reflective telescopic mirror arrangements are shown in FIGS. 1 and 2. In both, a plurality of independent segments 10 are produced and assembled into parabolic reflectors 12. The reflectors scan the skies under control of astronomers in conventional fashion, either manually or by computer. Each segment 10 is separately mounted on a plurality of hydraulic screw-driven actuators (not shown) which are individually digitally controlled to maintain an accurate relationship within a 0.001 micron optical tolerance from one segment to the next. As such control is not a necessary aspect of this invention, suffice it to say that these techniques are known in the field of astronomy and will not be described herein except as background for products which can be produced by the machine of this invention. The segments are produced to a very high degree of accuracy by being mounted on the same kind and size of structure during machining as is used in their functional operation when in the final reflector.

An exemplary array of parabolic reflectors 12 is shown in FIG. 1, the array,being capable of combining the outputs of the several collectors into a simulated single image under sophisticated computerized control, in a manner now well understood in that art. In this example, six 6-meter reflectors are placed ten to fifteen meters apart along their baselines 13 and are adapted to receive electromagnetic waves between 1.3 to 0.3 millimeters in length, The FIG. 1 example has been dubbed a "submillimeter array" by the astronomers involved in its development. There is wide recognition in their field that the skies are virtually unexplored at submillimeter wavelengths, i.e., those which can view, quasars and "black holes". Depending on the spacing of the mirrors, the angular resolution of 0.87 millimeter wavelengths will range between 12 and 0.8 arcseconds for ten and fifteen meter spacing respectively. FIG. 2 shows a single reflector 12 and its support structure 15. This collector can be part of a multi-mirror array of mirrors as in FIG. 1 or can be a stand-alone unit of more than double the 6-meter unit illustrated in FIG. 2.

In addition to the obvious weight savings as compared to full-diameter refractive glass lenses, one of the benefits of segmented mirrors is the ability to assemble the segments into much larger mirrors than had been previously attainable. They can be produced in diameters as large as fifteen meters, very much larger than is possible in the construction and use of conventional non-segmented refractive lenses.

The thermal inertia of larger glass lenses, i.e., the inability of the glass to change in temperature as quickly as the air directly surrounding the lens, has been a major cause of image distortion with such lenses. This can be easily compensated for in a segmented mirror. Astronomical telescopy is one of the few technologies where the larger the mirror, the greater the image resolution. While the combined effects of a multi-mirror array such as that shown in FIG. 1 can achieve improved results because of their combined images, the need still exists for large diameter single, stand-alone unit. The reflector 12 of FIG. 2 is turret-mounted for tipping, tilting and rotating about a vertical axis. As each positional change is made, compensation must be made for the effects of gravity as well as any environmental changes that occur as a result of the shift. These effects can be wind, air temperature variations due to the repositioning, etc. As required to compensate, a computer will adjust each segment 10 with respect to its next adjacent neighboring segment in response to detectors, (not shown), which are capable of detecting the need to refocus the segments of mirror surface to properly receive the image of the body being viewed.

The segments to-be produced are of pure non-oxidizable aluminum. Once provided with a highly reflective mirror surface, that condition is retained. While any surface is capable of collecting dirt, the reflectors 12 are typically located at high elevations, well above contaminating earth elements. Additionally, any cleaning required can be done without the wearing effects of polishing as is often necessary with glass mirrors. Furthermore, in the event any segment 10 distorts or loses its surface resolution due to any of several factors, a substitute segment can be placed in the reflector with nominal inconvenience, and the affected segment returned to the factory for remachining.

Figure 4:
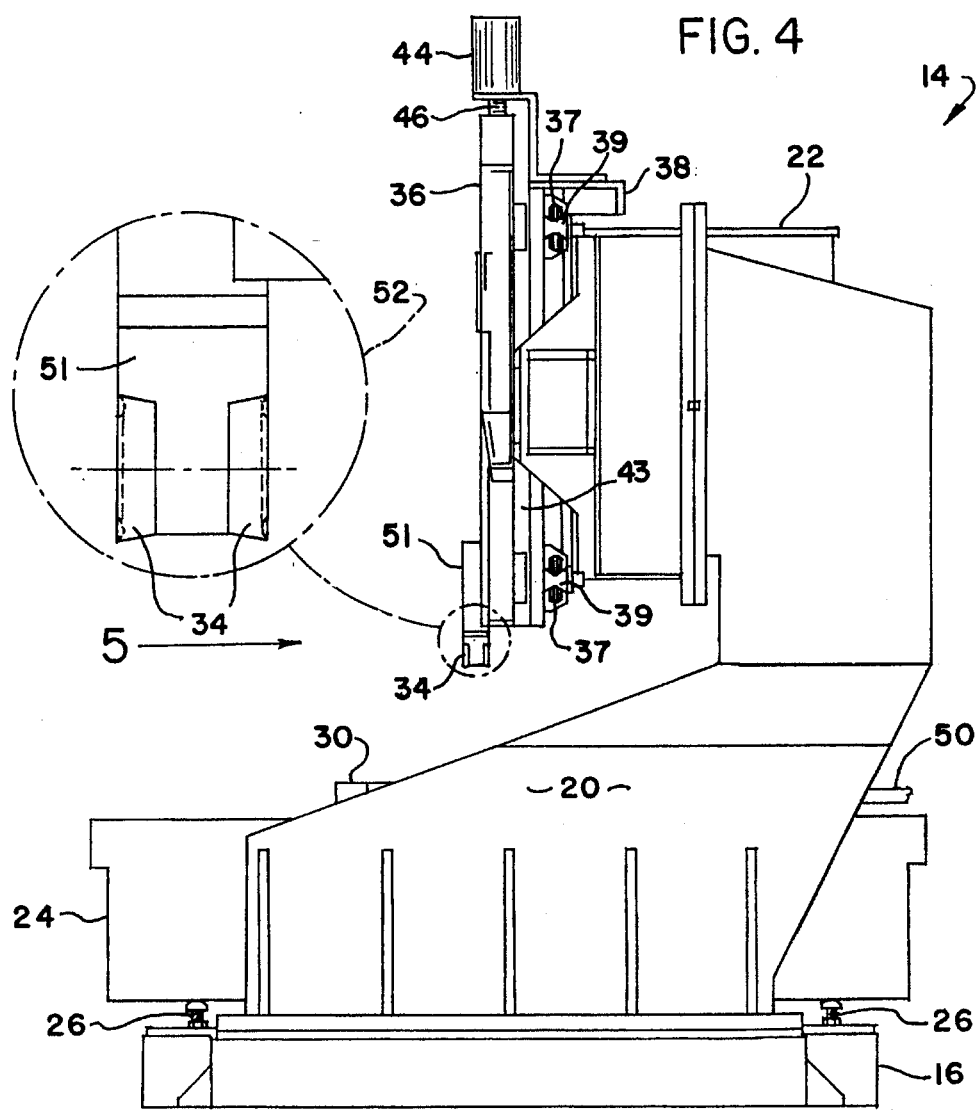
FIG. 4 is an enlarged side elevational view of the machine taken from the right as viewed in FIG. 3, with an appended enlargement of one form of cutting tool.

Machine 14 has as its main structural components a base 16, left and right vertical columns 18 and 20 respectively, and a tool-supporting bridge 22. All are fabricated of steel and their respective connective surfaces are accurately machined for assembly by means of conventional fasteners. A thick, stable granite bed 24, 2.4 meters in width by 3 meters in length, is supported on three-point, triangularly-spaced suspension means 26, seen best in FIGS. 4 and 5. The bed 24 is highly polished to a surface resolution of five microns, and its top surface is smooth and substantially non-porous.

A unique hinge 28 (described in detail in FIGS. 13 and 14) is mounted on left column 18 to support the left end of an elongated platen 30 for pivotal or oscillatory movement in the direction of arrow 32. The platen 30 serves to support the segments 10 as they are individually machined by one or a pair of diamond-coated carbide cutting tools 34 mounted on a ram 36. The ram 36 is carried by a saddle 38 which is movable horizontally on roller bearings 37 (FIG. 4) along ways 39 representing an x axis (schematic FIG. 12). Horizontal movement is in response to rotation of a ball screw 40 driven by a servo motor 42 mounted on the left column 18. Saddle 38 supports a second servo motor which drives a similar ball screw 46 to move the ram vertically along ways 45 representing a z axis, (also seen in FIG. 12). The tool 34 is first positioned in a fixed location along the two axes, maintained in that position while the platen oscillates past the tool to perform cutting, and is then repositioned for the next machining pass.

Oscillation may be by any conventional means and is depicted here as a simple flyweighted crank arm 48 which reciprocates a link 50 connected to one side of the platen 30 to move the platen and any workpiece carried thereby past the cutting tool 34. In the example illustrated, the platen 30 is oscillated twenty strokes per minute over 37.5 degrees to machine fifteen and thirty degree panels for the reflector 12. The cutting tool 34 is shown in greater detail in the enlarged dot-dash circle 82 at the left of FIG. 4. For rough cutting, cuts can be made in each both directions of oscillation, and therefore two opposed circular cutting buttons are shown. The button tools are secured to a tool support 51, but each is made to be rotationally adjustable about a horizontal axis to present a different cutting edge to the workpiece if needed. When a final finishing cut is performed, it is done by only a single tool 34 and in only one direction of oscillation. This provides a highly burnished, highly reflective surface, needing no polishing. It is ready for installation in a reflector after the final cut is made. The tool or tools 34 are indexed to new positions along both the x and z axes after each cutting pass. The amount of indexing is dependent on the size of the cutting tool 34. To perform the finish and accuracy required, a button of 2.5 centimeters in diameter is horizontally indexed 0.2 millimeters along the x axis after each cutting pass. The essence is to produce a cut which is that length of the chord or the circular tool 34 which provides a continuous smooth surface on the face of the workpiece.

Figure 10:
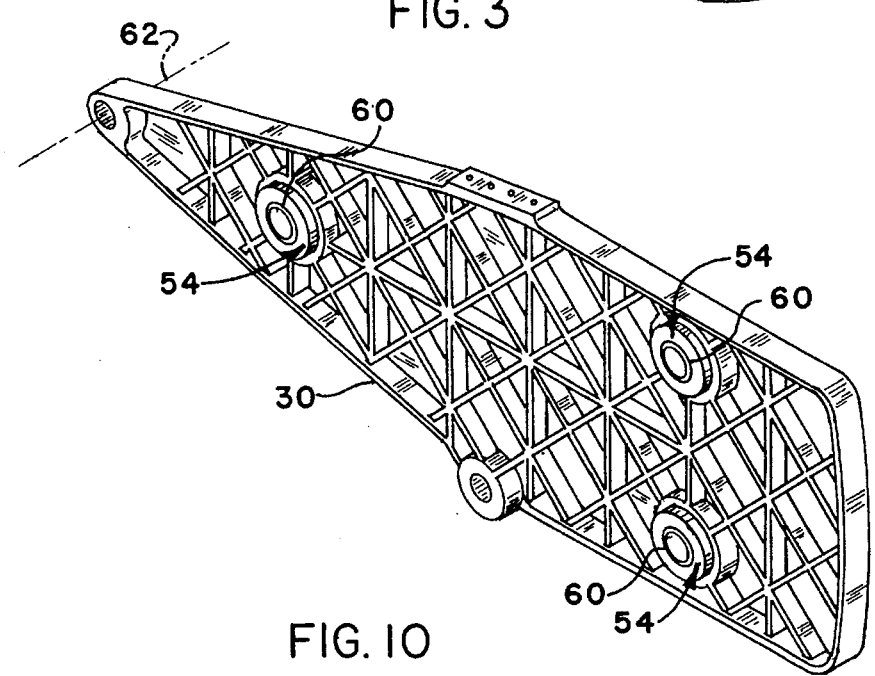
FIG. 10 is an Underside view of the platen which supports the panels of FIGS. 7–9 on it upper side during their machining.
Figure 11:
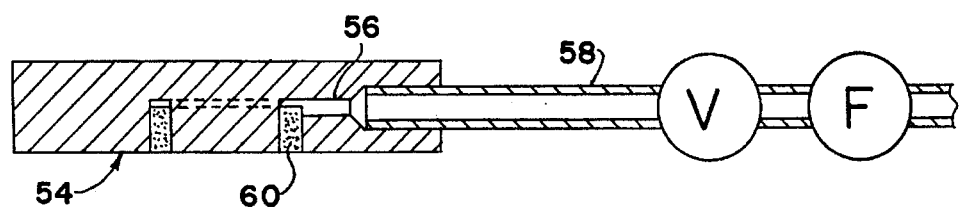
FIG. 11 is a schematic elevational view of one of the three air bearings used to support the platen of FIG. 10 on a cushion of air during platen oscillation.
Figure 6:
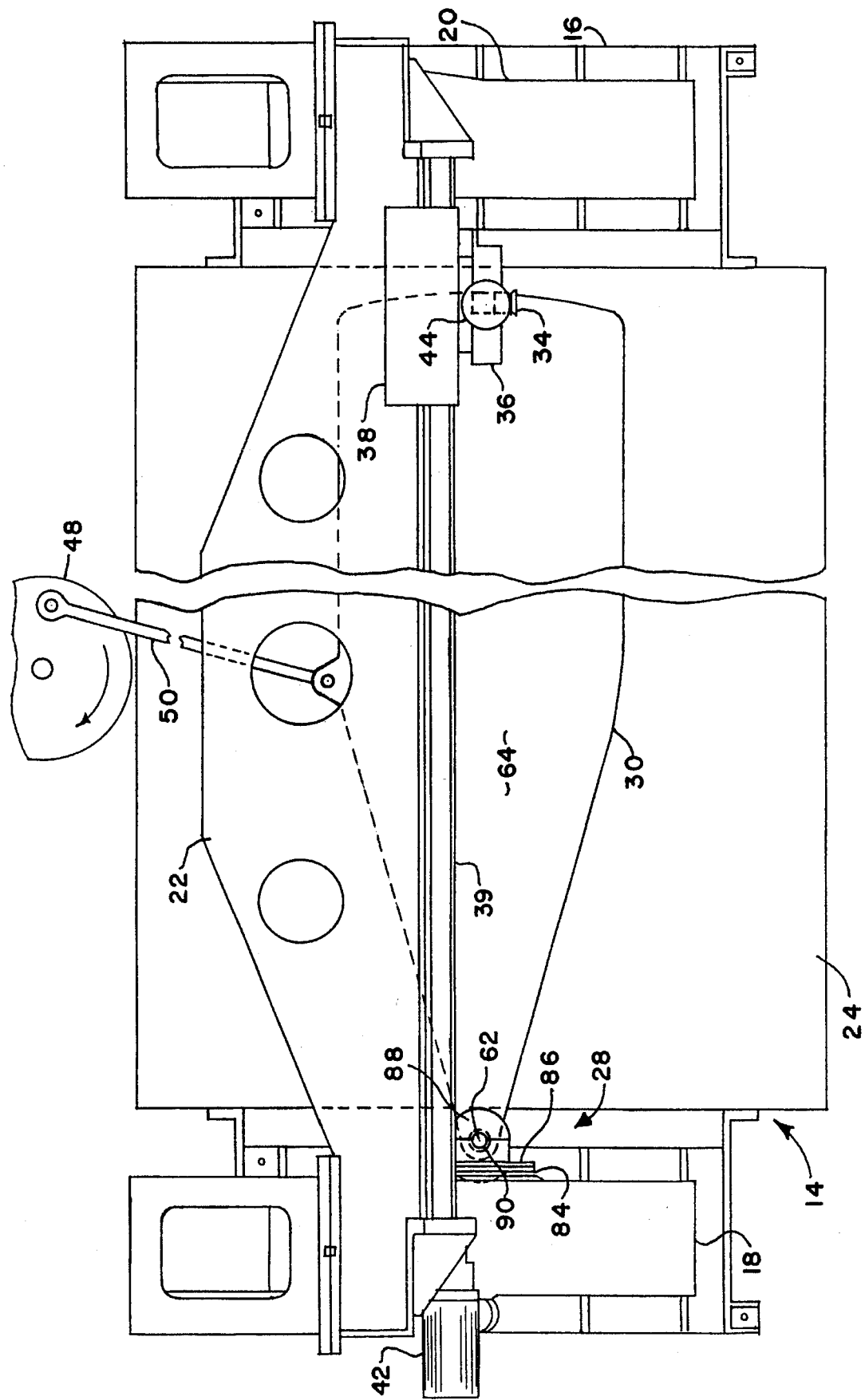
FIG. 6 is a fragmentary plan view of the machine looking down in the direction of the arrow 6 of FIG. 5.

The platen 30 is shown from the underside in FIG. 10. It carries three triangularly-spaced air bearings 54 which face downwardly for supporting the platen 30 on an air cushion as it moves over the top surface of the granite bed 24. The bearings 54 are positioned on harmonic dead spots of the platen 30. The bearings 54 provide for non-contact floating operation of the platen over bed 24 as it is oscillated in response to the cranking motion. The air bearings are well known in the art, being purchased from AeroDyne Belgium of Westkerke, Belgium. One such bearing is shown schematically in FIG. 11. Air filtered by filter F is communicated to a circumferential groove 56 through conduit 58 and provides the air cushion for the lower surface of the bearing 54 by passage through the wall of a short porous tube 60. The film of air spreads radially outwardly along the granite surface Of the bed 24, performing a self-cleaning function with respect to their respective paths of travel of the bearings 54. The particular air bearings 54 used, Model PD-RA 215, are each capable of supporting a 600 kilogram object at an air pressure of 30 kilograms per square centimeter. The tube 60 has a porosity of five microns, necessitating that the filter F exclude from the air supply any particulate matter above the size of the interstitial openings in the tube from reaching and clogging the bearings. Filter F is a one micron filter, i.e., capable of filtering from the air reaching the filter any particle larger than that size.

The entire operation of the machine described herein is performed in a "clean room", i.e., one which is secured against any outside contamination. Temperature of the clean room is constantly maintained within plus or minus two degrees. The high degree of machining accuracy required to achieve the extreme accuracy of the finish for a parabolic reflector dictates that everything be as near perfect in cleanliness as possible. Any dirt or other contaminant on the bed where the air bearings glide over the surface might result in unacceptable product and has the potential for scoring and thereby,affecting the accuracy of the bed surface and bearings. This is partially compensated for by the self-cleaning capability of air flow exiting from the air bearings 54, but also results from use of conventional vacuum cleaning nozzles, (not shown), which surround the cutting tools 34. An example of an off-the-shelf vacuum cleaning system usable is manufactured by Spencer Industravac of Columbus, Ohio.

The segments 10 are contoured both radially along the length of the platen 30 and circularly, from side to side of the platen 30 defined by an arc about a pivotal axis 62 of the platen (FIGS. 10 and 14). The effect is similar to that of producing a bowl on a wood-turning lathe, but with one significant difference. The tool of a wood-turning lathe has a compound motion which results in a gradual spiral cutting action, either radially inward or outward. In contrast, the tool of the present invention is held absolutely fixed for any given cutting pass, resulting in a true circular cut rather than a spiral cut. It may be said that the machine of this invention tends to simulate the actions of a lathe, but the results are different by virtue of achieving a true circular rather than a spiral or helical cut. To obtain a true surface for a reflector 12 or, as illustrated in this particular design, for a segment of such a reflector, the cut must be circular. If not, the focus of the reflector would result in poor resolution and a diffused image. Because the diameter of the reflector is so large, production in segments can reduce the overall size of the machine to essentially the radius of the reflector, or, in some instances, to the radial length of a segment. However, the machine is not limited to a reflector radius the length of the platen 30, since the pivotal axis of the platen can be moved outward of the left column 18 by straddling the column and mounting a hinge comparable to hinge 28 leftwardly of the column 18.

Figure 5:
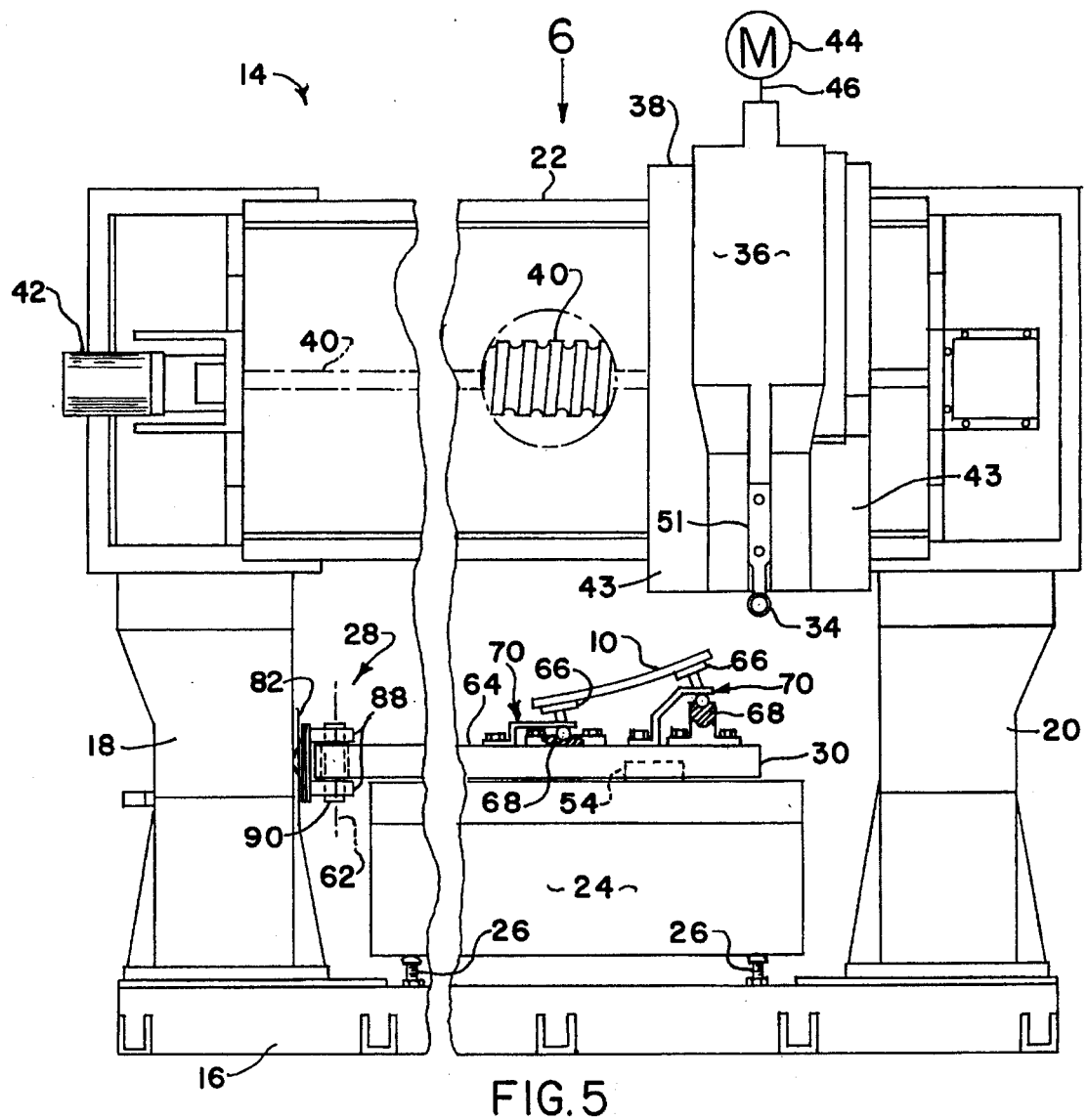
FIG. 5 is a fragmentary elevational view taken looking from an operator's side in the direction of the arrow 5 of FIG. 4.

Let us now consider how individual segments 10 are produced. One such segment is shown in FIG. 5. It is mounted at the outer extremity of the platen 30, indicating that it is a segment which is to be located at the outer periphery of a final reflector 20. The next inwardly located segments would be positioned toward the axis of the platen 30 on its upper, surface. For ease of description, as well as to illustrate that the machine has use for producing contoured products other than segments of a reflective mirror, the segments may also be referred to as "panels" during the machining operation, since it is only the upper flat surfaces of the segments which are machined.

A panel 10 in FIG. 5 is clamped to the panel-supporting surface 84 of the platen 30. The panel in this instance is a precast highly-accurate casting shown in FIGS. 7–9. Bosses 88 are preliminarily machined on the bottom side of the panel and screwholes are provided for fastening ball elements thereto. The ball elements are eventually to be seated in ball sockets of the pistons which later adjust the segments in the final assembled reflector 12. Comparable ball elements are shown schematically in FIG. 5. They are used to support a panel 10 in the same relationship on the platen 30 that the given panel is to occupy in the end product. A socket 68 is attached on the platen surface 64 for each ball and clamping means 70 of any conventional type can straddle each ball and maintain it firmly in the socket during machining. In this manner, machining is achieved exactly as is eventually required for mounting each segment in the reflector. Holes and attaching means, (not shown), are provided at the upper surface 64 of the platen for mounting the sockets 68 and the clamping means 68.

Figure 12:
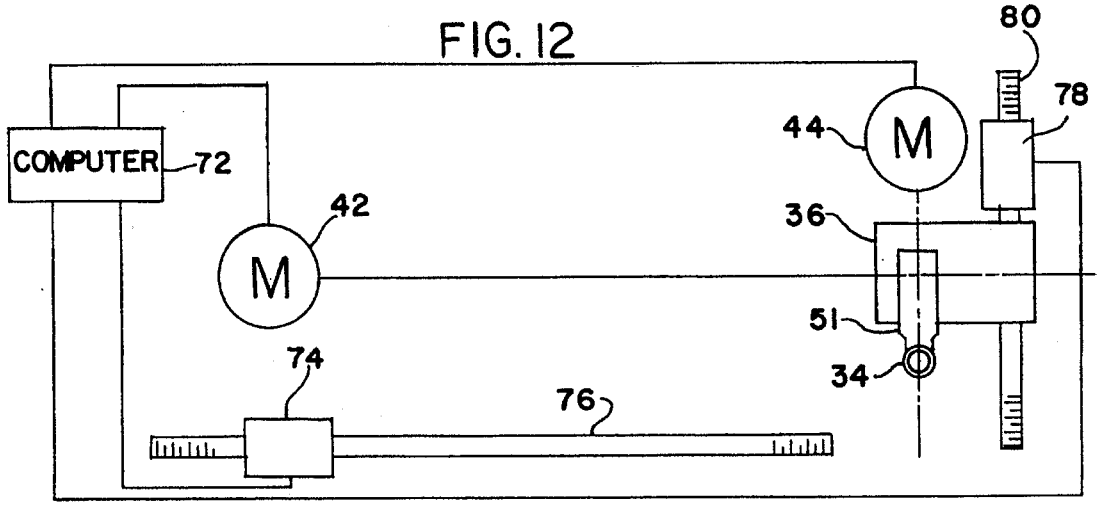
FIG. 12 is a simplified schematic control diagram illustrating computerized position control of the cutting tool with respect to the panel being machined.

FIG. 12 is a simplified schematic representation of computer control of tool positioning along the x and z axes. Servo motor 42 incrementally indexes the tool 34 horizontally along the x axis as called to do so by a relatively simple program installed in computer 72. The program need only position for the z axis, off which the x axis would slave. The simpler programming is estimated to provide a cost advantage of 5:1 over the programming that would be required to achieve a comparable result on a 5-axis CNC machine. The position is determined by a scanning head 74 traversing a horizontal scale 76 of an exposed incremental linear encoder manufactured by Heidenheim GmbH of Traunheut, Germany. The vertical positioning of tool 34 is via a scanning head 78 along scale 80 manufactured by the same company. Scanning heads 74 and 78 are affixed to and travel with the saddle 38 and ram 36 respectively, in conventional fashion. The increments of movement are determined according to that necessary to produce the accuracy of finish required. The radial and circular contours machined onto the panel surface are determined by the location and angularity of the panel 10 on the platen 30. To minimize the need for excessive machining, the cast panels are only slightly greater in thickness than the end machined product. Thus, only a single rough bi-directional cut and a single unidirectional finish cut are normally required for each panel. The accuracy of the cast segment also determines its eventual end weight in the reflector as well as its overall thickness in relation to other of the segments. In the reflector for which the machine was originally designed, there are only four different sizes and shapes of panels. Certain ones are thirty degrees and others are fifteen degrees. For those that are thirty degrees, twelve panels circumscribe the circular row in the reflector. Twenty-four panels are located in the row of fifteen degree panels.

FIGS. 13 and 14 illustrate the unique hinge 28. The hinge 28 is mounted on a vertical pad 82 machined on the inner side of left column 18. It comprises a ball plate 84, a shaft-supporting plate 86, a pair of removable shaft-capturing caps 88 and a vertical shaft 90 held to the plate 86 by the caps 88. The shaft 90 receives a ball sleeve 92 carried by the platen 30 and forming its pivotal axis 62. The ball sleeve 92, the shaft on which it is mounted and the openings receiving the shaft 90 are all maintained to very high degree of accuracy. However, it will be noticed that a small spacing appears between the platen 30 and the adjacent surfaces of the two caps 88. This allows flotation of the platen vertically whenever air pressure is provided to the air bearings 54.

The key feature of the design of the hinge 28 is its ability to restrain the platen against horizontal movement toward or away from the pad 82 of the column 18 while enabling accurate vertical platen movement to accommodate the application of air pressure to bearings 54. A spherical concave surface 94 is machined into the column 18 at pad 82, and a mating spherical convex surface 96 is provided on the left face of the plate 84. Preferably, the spherical surface 96 and ball plate 84 are integral and are machined from a single piece of nickel stock. The column being steel, the bearing surfaces 94 and 96 are self lubricating in the dry state, and can be kept in very close contact under a spring bias provided by Bellville washers 98. Three shouldered bolts 100 spaced 120 degrees apart about the sphere hold the ball plate 84 and it convex surface 96 snuggly against the concave surface 96.

A space is provided between the left side of ball plate 84 and the facing side of pad 82 to allow freedom of pivoting of the ball plate 84 about the concave bearing surface 94. The center of the ball or sphere is shown by the numeral 102 in FIG. 14. This center coincides with that of the axis 62 of the platen 30. Thus, any lifting, lowering, pitching or rolling of the platen as it is oscillated are all about center 102 and linear movement of the elongated platen is prevented, even though minute vertical movement is permitted along axis 62. As can be seen from FIG. 14, retention bolts 104 and slots 108 allow for vertical adjustment of shaft-supporting plate 88 relative to ball plate 84 before being fixed in final operating position. Plate 88 is also provided with slots 108 to accommodate vertical adjustment. Clearance is provided at slots 108 to allow for expansion and contraction of the Bellville washers as the ball plate 84 tends to want to move about center 102 in the event of slight rotational or rolling movement of the platen.

At start-up and shut-down of operation of the unit, a protocol must be followed to prevent damage to the surface of the granite bed 24 and air bearings 54. Before any crank motion can be applied to the platen 30, sufficient air flow must be present at the air bearing surfaces. If air is not flowing for any reason to all three bearings, or is insufficient at any one of the bearings, flow sensor switches (not shown) will inhibit operation of the crank arm 48. Insufficient air can be caused by any of the usual things, such as pump malfunctioning, clogged filter F, etc. Such flow sensors can be an/off switches which turn on, e.g., at flow of four liters of air/minute. With the sensors connected in series, it becomes essential that air be supplied to each bearing 54 in order to power-up the platen drive. If during operation one of the sensors detects inadequate air flow, damage to the bed 24 can occur unless means is provided to prevent it. This can be accomplished by providing means to maintain the platen above the bed until the crank arm 48 comes to rest. Such a means can consist of pistons beneath the platen which move down to support the platen above the bed promptly upon detecting an interruption in air exiting from the bearings 54. Whatever is provided in this regard should make contact along paths other than the arcuate paths of contact of the three air bearings 54 with the bed. Thus, if any bed surface scoring occurs, it will be outside the areas of air bearing contact with the bed.

Various changes, including but not restricted to producing the panels from other materials or by other surface-reducing techniques and to shapes other than parabolic may be made without departing from the spirit and scope of the claims.

Having described my invention, I claim:

1. A method of producing a radially and circularly contoured panel surface, comprising the steps of:

providing a platen elongated along an x axis and having a panel-supporting surface, said platen being mounted for pivotal movement in horizontal plane about a vertical axis adjacent one end of said platen;

providing a surface-reducing tool above and movable along a z axis perpendicularly toward and away from said horizontal plane;

fastening a panel on said panel-supporting surface with the surface of said panel to be reduced facing upwardly toward said tool;

locating said tool to one side of said panel in a first fixed position along both said x axis and said z axis for a first surface-reducing pass;

pivoting said platen about its vertical axis to move said panel relative to said tool while maintaining said tool in said first fixed position to perform a first surface-reducing pass of an arcuate linear swath across said panel;

returning said platen to its original position;

relocating said tool along said x axis and said z axis after completion of pivoting to a second fixed position different than said first fixed position to enable performing a second surface-reducing pass;

pivoting said platen about its vertical axis to perform said second pass; and selectively locating said tool relative to said panel surface along said x axis and said z axis after each successive pass, said platen movement and said tool repositioning resulting in creation of a surface on said panel which is both radially contoured in the direction of elongation of said platen and circularly contoured laterally across said panel.

2. A method according to claim 1 wherein the contoured surface produced is concave.

3. A method according to claim 2 wherein said panel is metallic and wherein surface reduction is performed through metal removal by cutting tool.

4. A method according to claim 3 wherein said panel constitutes one of a plurality of pure aluminum panels of a segmented parabolic reflector and wherein said machining includes the steps of oscillating said platen to make an arcuate first rough-cut swath in one direction of oscillation and an arcuate second rough cut swath in a different but adjacent return direction of oscillation, and wherein corresponding finishing cuts are performed upon completion of said rough swaths over the entire surface of said panel, said finishing cuts all being produced in the same direction of oscillation whereby to produce a highly-reflective burnished surface.

5. A method according to claim 4 wherein said panel surfaces are finished to a resolution accuracy within 5 microns, enabling its detection of light wavelengths of less than one millimeter, and wherein said method further includes the step of assembling said panels into such reflector.

6. A method according to claim 4 including the additional step of locating each panel on said panel-supporting surface at a radial distance with respect to said platen vertical axis corresponding to the radial distance which each panel is to occupy when assembled in said segmented reflector with other said panels.

7. A method according to claim 4 wherein a pair of adjacent said surface-reducing tools are provided with cutting edges aligned in the direction of a surface-reducing pass for performing of opposite-direction first and second roughcut swaths, and wherein a single tool is produces said finishing cut, said tools being circular and of a diameter substantially larger than the distance said tool is repositioned along said axes after completion of each machining pass, and wherein said method includes the further step of repositioning the tool a given distance along said x axis after each machining pass in accordance with the diameter of said tool while also avoiding any irregularity in the finished radial contour of said x axis.

8. A method according to claim 1 including the additional step of providing a flat smooth-finished highly-stable stone base member having a horizontal surface accuracy within 5 microns, and wherein said method further includes the step of floating said platen of a thin cushion of air during surface reduction to reproduce the accuracy of said stone surface in the panel surface finish.

9. A method according to claim 8 including the additional step of providing a combination spherical hinge means and vertical journal for said platen, said hinge means maintaining said platen against radial movement thereof in the direction of platen elongation while allowing limited movement of said platen in non-radial directions about said spherical hinge means and vertical floating movement of said platen on said thin air cushion.

10. In an apparatus for producing a radially and circularly contoured surface on a workpiece;

a base member having a horizontal planar surface;

a radially-elongated platen having a workpiece-supporting upper surface, said platen being pivotally mounted on a vertical axis adjacent one end of said platen for oscillation in a plane above and parallel to said planar surface;

means for oscillating said platen about its axis;

anti-friction means supporting said platen on said planar surface for gliding movement thereover;

means for fastening a workpiece on said platen upper surface;

a horizontal track above said platen, said track being parallel to said planar surface of said base member and extending generally along a radial x axis in the direction of elongation of said platen;

a saddle mounted for horizontal movement along said track for positioning said saddle along said x axis;

a ram mounted for vertical movement relative to said saddle;

a tool having a surface-reducing portion carried by said ram for contacting and reducing the surface of said workpiece in successive arcuate linear swaths at different radii with respect to said pivotal axis as said workpiece is oscillated;

means for moving said ram and therewith said tool along a z axis in a direction perpendicular to the planar surface of said base member; and means for controlling the position of said tool relative to said base member at different radii of oscillation of said platen and at different vertical distances from said planar surface in order to generate a finished radially and circularly contoured curvature on the upper surface of said workpiece.

11. An apparatus according to claim 10 wherein the finished surface produced is concave.

12. An apparatus according to claim 10 wherein said workpiece is one reflective surface panel of a multi-panel segmented parabolic reflector.

13. An apparatus according to claim 12 wherein each of said panels of said reflector are metallic, and wherein said producing is by means of removing metal from said reflective surface by means of said tool.

14. An apparatus according to claim 13 wherein each of said panels is pure aluminum, and wherein said tool, when performing a finishing cut during oscillation of said platen, creates a burnishing effect in said reflective surface to produce a permanent mirror finish.

15. An apparatus according to claim 14 wherein each of said panels has a surface finish of an accuracy within 5 microns.

16. An apparatus according to claim 12 wherein each panel is fastened to said platen at a radius corresponding to the radius it occupies in said parabolic reflector.

17. An apparatus according to claim 14 wherein said panel is initially provided as a concave precision casting from which only a nominal amount of surface material needs to be removed, and wherein said panel is mounted on said platen with its surface at an angle relative to said platen surface, said angle corresponding to the radial position said panel will occupy in an assembled parabolic reflector.

18. An apparatus according to claim 17 wherein said platen is of a length enabling a plurality of panels to be individually mounted thereon, each panel being located at a respective distance from said vertical axis corresponding to each panel's radial position in the assembled parabolic reflector.

19. An apparatus according to claim 10 wherein said base member comprises a granite slab having a surface finish accuracy within 5 approximately microns.

20. An apparatus according to claim 19 wherein said anti-friction means comprises three triangularly-spaced downwardly-facing air bearings mounted on the underside of said platen, each of said air bearings maintaining said air bearings above the surface of said slab during supplying of air thereto to maintain said platen and its associated air bearings off the surface of the slab during oscillation of said platen.

21. An apparatus according to claim 10 wherein a first linear scale is provided along said x axis and a second linear scale is provided along said z axis, a pair of sensing means respectively associated with said saddle and said ram for sensing the position of said tool along said linear scales, a computer, and wherein said tool is automatically positioned along said axes by said computer in response to the sensed positions of said saddle and ram.

22. An apparatus according to claim 10 including hinge means supporting said platen for limited floating and rocking movement relative to its vertical axis but restrained against movement in the direction of platen elongation.

23. An apparatus according to claim 22 wherein said hinge means includes a spherical bearing having a concave surface fixed relative to said base and a convex surface maintained in contact therewith adjacent the vertical axis of said platen, a journaling surface providing said vertical axis, said journaling surface being connected to said spherical bearing with the vertical axis coinciding with the center of said spherical bearing, and said platen being pivotally mounted about said journaling surface with a limited amount of vertical play to accommodate both vertical and rolling motion of said platen during oscillation.

24. An apparatus according to claim 23 wherein said convex spherical surface is mounted on a plate, and including spring means biasing said plate and said convex surface toward said concave surface, and wherein said journaling surface is mounted on said plate on its side opposite said convex-surface.

25. An apparatus according to claim 24 wherein said journaling surface includes a shaft attached to said plate.

26. An apparatus according to claim 25 wherein said platen is free to pivot and float vertically relative to said shaft.

* * * * *